(12) United States Patent
Kieser-Neumeyer et al.

(10) Patent No.: US 12,515,565 B2
(45) Date of Patent: Jan. 6, 2026

(54) ASSEMBLY OF A VEHICLE, COMPRISING A LONGITUDINAL ADJUSTMENT OF A VEHICLE SEAT

(71) Applicant: BROSE FAHRZEUGTEILE SE & CO. KOMMANDITGESELLSCHAFT, COBURG, Coburg (DE)

(72) Inventors: Sandra Kieser-Neumeyer, Coburg (DE); Gregor Kröner, Bischberg (DE)

(73) Assignee: BROSE FAHRZEUGTEILE SE & CO. KOMMANDITGESELLSCHAFT, COBURG, Coburg (DE)

( * ) Notice: Subject to any disclaimer, the term of this patent is extended or adjusted under 35 U.S.C. 154(b) by 207 days.

(21) Appl. No.: 18/260,432

(22) PCT Filed: Jan. 14, 2022

(86) PCT No.: PCT/EP2022/050723
§ 371 (c)(1),
(2) Date: Jul. 5, 2023

(87) PCT Pub. No.: WO2022/157078
PCT Pub. Date: Jul. 28, 2022

(65) Prior Publication Data
US 2024/0300385 A1 Sep. 12, 2024

(30) Foreign Application Priority Data
Jan. 19, 2021 (DE) .................... 10 2021 200 454.7

(51) Int. Cl.
*B60N 2/02* (2006.01)
*B60N 2/07* (2006.01)
*B60N 2/12* (2006.01)

(52) U.S. Cl.
CPC ........... *B60N 2/02253* (2023.08); *B60N 2/12* (2013.01)

(58) Field of Classification Search
CPC .. B60N 2/02246; B60N 2/02253; B60N 2/06; B60N 2/067; B60N 2/04
See application file for complete search history.

(56) References Cited

U.S. PATENT DOCUMENTS

| 5,950,978 | A | 9/1999 | Eguchi et al. | |
| 7,452,019 | B1 * | 11/2008 | Day .................... | B60N 2/309 297/344.13 |

(Continued)

FOREIGN PATENT DOCUMENTS

| DE | 102015215592 A1 | 2/2017 |
| DE | 102017208113 A1 | 11/2017 |

(Continued)

OTHER PUBLICATIONS

ISA European Patent Office, International Search Report Issued in Application No. PCT/EP2022/050723, Jul. 11, 2022, WIPO, 8 pages.

(Continued)

*Primary Examiner* — Shin H Kim
(74) *Attorney, Agent, or Firm* — McCoy Russell LLP (57) ABSTRACT

An assembly of a vehicle comprises a floor assembly arranged stationary in the vehicle, a floor portion and an adjustment apparatus for longitudinal adjustment of a vehicle seat in the vehicle, the adjustment apparatus having a guide rail which is connected to the floor assembly and extends along a longitudinal axis on the floor assembly, an adjustment assembly which is guided on the guide rail along the longitudinal axis and is assigned to the vehicle seat, and a drive device with a drive motor, an adjusting transmission and a transmission element connecting the drive motor to the adjusting transmission. The adjusting transmission can be (Continued)

driven by the drive motor for adjusting the adjustment assembly relative to the guide rail.

16 Claims, 5 Drawing Sheets

(56) References Cited

U.S. PATENT DOCUMENTS

| | | | |
|---|---|---|---|
| 12,071,044 B2 * | 8/2024 | Zhao | B60N 2/07 |
| 2009/0020331 A1 | 1/2009 | Tsubaki | |
| 2009/0298326 A1 | 12/2009 | Van Der Mee et al. | |
| 2010/0101360 A1 | 4/2010 | Tokumitsu | |
| 2012/0024564 A1 | 2/2012 | Sekino et al. | |
| 2017/0334314 A1 | 11/2017 | Takada | |
| 2018/0257220 A1 | 9/2018 | Bartsch | |
| 2018/0334054 A1 * | 11/2018 | Higuchi | B60N 2/02246 |
| 2019/0389331 A1 | 12/2019 | Schukalski et al. | |
| 2020/0207241 A1 | 7/2020 | Moulin et al. | |
| 2020/0215999 A1 | 7/2020 | Yamamoto et al. | |
| 2020/0361372 A1 * | 11/2020 | Kominato | B60N 2/07 |
| 2021/0151966 A1 | 5/2021 | Yamamoto et al. | |
| 2021/0394646 A1 | 12/2021 | Meguro et al. | |
| 2022/0024355 A1 * | 1/2022 | Napau | B60N 2/02246 |
| 2022/0080862 A1 * | 3/2022 | Simms | B60N 2/02253 |
| 2022/0219569 A1 * | 7/2022 | Zhao | B60N 2/06 |
| 2023/0062149 A1 * | 3/2023 | Zhao | B60N 2/02246 |
| 2023/0294564 A1 * | 9/2023 | Zhao | B60N 2/0224 248/429 |
| 2023/0294565 A1 * | 9/2023 | Li | B60N 2/02246 |

FOREIGN PATENT DOCUMENTS

| | | |
|---|---|---|
| DE | 102016224512 A1 | 6/2018 |
| DE | 102016224878 A1 | 6/2018 |
| DE | 112018003695 T5 | 3/2020 |
| EP | 1571034 A2 | 9/2005 |
| EP | 1783875 A1 | 5/2007 |
| EP | 2128022 B1 | 11/2012 |
| JP | 2020010515 A | 1/2020 |
| KR | 20100033583 A | 3/2010 |
| WO | 2018207589 A1 | 11/2018 |
| WO | 2020090575 A1 | 5/2020 |
| WO | 2020140659 A1 | 7/2020 |
| WO | 2020186259 A1 | 9/2020 |

OTHER PUBLICATIONS

United States Patent and Trademark Office, Non-Final Office Action Issued in U.S. Appl. No. 18/261,079, filed Apr. 16, 2025, 30 pages.

* cited by examiner

ASSEMBLY OF A VEHICLE, COMPRISING A LONGITUDINAL ADJUSTMENT OF A VEHICLE SEAT

CROSS REFERENCE TO RELATED APPLICATIONS

The present application is a U.S. National Phase of International Application No. PCT/EP2022/050723 entitled "ASSEMBLY OF A VEHICLE, COMPRISING A LONGITUDINAL ADJUSTMENT OF A VEHICLE SEAT," and filed on Jan. 14, 2022. International Application No. PCT/EP2022/050723 claims priority to German Patent Application No. 10 2021 200 454.7 filed on Jan. 19, 2021. The entire contents of each of the above-listed applications are hereby incorporated by reference for all purposes.

BACKGROUND

The disclosure relates to an assembly of a vehicle.

An assembly of this kind comprises a floor assembly that is arranged stationary in the vehicle, a floor portion, and an adjustment apparatus for longitudinal adjustment of a vehicle seat in the vehicle. The adjustment apparatus comprises a guide rail which is connected to the floor assembly and extends along a longitudinal axis on the floor assembly, an adjustment assembly which is guided on the guide rail along the longitudinal axis and is assigned to the vehicle seat, and a drive device having a drive motor, an adjusting transmission and a transmission element that connects the drive motor to the adjusting transmission. The adjusting transmission can be driven by the drive motor for adjusting the adjustment assembly relative to the guide rail.

In a conventional vehicle, a vehicle seat can be adjusted relative to a vehicle floor forming a floor portion, by means of a longitudinal adjustment device, as is known for example from DE 10 2015 215 592 A1. In this case, guide rails extend in parallel with one another, on both sides of the vehicle seat, in order to shift the vehicle seat forwards or backwards in the vehicle and in this way to set a comfortable position for a vehicle occupant.

Conventional guide rails are configured so as to be comparatively short, for example shorter than 50 cm, in order to be able to adjust the vehicle seat between a forward position and a rearward position. However, in the context of new vehicle technologies, in particular in the context with autonomous driving, it may be desirable to design an adjustment range for a vehicle seat so as to be significantly larger, in order to be able to shift a vehicle seat for example far backwards, in a vehicle. For this purpose, it is envisaged to use significantly longer guide rails, in particular of a length of greater than 50 cm, which in turn are to be arranged fixedly in the vehicle.

Guide rails for longitudinal adjustment of a vehicle seat are typically arranged above a vehicle floor and are thus visible from the interior of the vehicle. This can be a disadvantage in particular in the case of long guide rails which should provide an extended adjustment range for a vehicle seat, because guide rails require installation space, possibly represent trip hazards in the vehicle interior for users, and can furthermore collect dirt.

Typically, a drive motor of a drive device is furthermore arranged in the region of the vehicle seat and results in a limitation of installation space in a footwell below the vehicle seat. A drive motor of this kind is typically configured to also travel along, and is correspondingly moved together with the vehicle seat upon movement of the vehicle seat for longitudinal adjustment along the guide rails.

A longitudinal adjustment apparatus for a vehicle seat is known from WO 2020/186259 A1, in which a guide rail arrangement is arranged on a vehicle floor. An upper guide rail can be moved towards a lower guide rail, by means of an adjusting transmission in the form of a belt drive, in order to thereby adjust the vehicle seat longitudinally.

A vehicle seat is known from U.S. Pat. No. 5,950,978 in which a lower guide rail is received in a recess of a vehicle floor, such that an upper side of the lower guide rail is flush with an upper surface portion of the vehicle floor. The vehicle seat is guided in the guide rail and can be adjusted longitudinally via a drive device.

SUMMARY

It is the object of the proposed solution to provide an assembly of a vehicle which allows for an arrangement of an adjustment apparatus for longitudinal adjustment of a vehicle seat that is favorable in terms of installation space.

This object is achieved by an assembly having features as described herein.

According thereto, the guide rail and the adjusting transmission are arranged below the floor portion as viewed along a height direction, and the drive motor is arranged above the floor portion as viewed along the height direction, wherein the transmission element extends through an opening of the floor portion.

An interior of a vehicle is typically delimited downwards by a vehicle floor, which is covered for example by a carpet and serves as an area for users to place their feet on. In this case, the vehicle floor extends above the vehicle body structure, which constitutes the bearing framework of the vehicle and comprises beams or what are known as sills for forming a bearing structure for the vehicle.

In the present case, the guide rail of the adjustment apparatus is arranged below a floor portion (formed by the vehicle floor) and connected to a floor assembly, for example a bodywork structure. The guide rail thus extends below the floor portion of the vehicle floor, and is thus not directly visible from the interior of the vehicle.

In contrast, the drive motor of the adjustment apparatus is arranged above the floor portion and is thus located above the guide rail, along the height direction corresponding to the vehicle vertical direction. An arrangement results in which the guide rail is hidden below the vehicle floor, while in contrast the drive motor is arranged above the vehicle floor, in the region of the vehicle seat.

This makes it possible to hide the guide rail in the vehicle, such that the guide rail is not visible to a user, and therefore does not impair the aesthetic impression in the vehicle interior and cannot constitute a trip hazard for a user either. The accumulation of dirt in the region of the guide rail can also at least be reduced.

However, since the drive motor is arranged above the vehicle floor, the drive motor does not require any installation space below the vehicle floor, and therefore the guide rail can be received on the floor assembly of the vehicle body in an efficient manner with respect to installation space. In this case, the drive motor can be received in the region of the vehicle seat in an installation space-saving manner, for example in the region of the adjustment assembly for connecting the vehicle seat to the guide rail arranged below the vehicle floor, such that the drive motor is moved together with the adjustment assembly, upon adjustment of the adjustment assembly. This makes it possible for example to keep a footwell below the vehicle seat free as far as possible, wherein the drive motor can be received for example in the region of a trim of the adjustment assembly.

Since the guide rail is received below the floor portion of the vehicle floor, but the drive motor is arranged above the floor portion, the transmission element that connects the drive motor to the adjusting transmission, for example in the form of a drive shaft, extends through an opening in the floor portion of the vehicle floor. The transmission element can be formed for example by a flexible shaft and can in this case extend substantially in a straight line or also curved, between the drive motor and the adjusting transmission. In this case, the opening in the floor portion can be configured in a slot-shaped manner for example, such that the transmission element can move in the opening in the event of a movement of the adjustment assembly relative to the guide rail stationary-arranged and can in particular be adjusted using the adjustment assembly.

The transmission element can be configured for example by a drive shaft, in particular a flexible drive shaft. The transmission element can, however, also assume the form of a sprocket, a worm or another gear mechanism element for example.

In one embodiment, the transmission element extends perpendicularly or almost perpendicularly through the opening of the floor portion. The floor portion can extend planarly along an extension plane. The transmission element can in this case extend perpendicularly or almost perpendicularly relative to the floor portion. In this case, "almost perpendicularly" is to be understood to mean that the transmission element, for example in the form of an elongated extending shaft, extends at an orientation having an angular deviation of at most 15°, for example at most 10°, preferably at most 8°, in particular at most 5°, furthermore in particular at most 3°, relative to the perpendicular direction (according to the normal direction of the floor portion corresponding to the vehicle vertical direction).

If the transmission element is configured by a flexible shaft, then the flexible shaft can for example be deflected about a certain angle on its extension path, for example an angle between 30° and 180°, for example in the range of 90°, for example in order to extend between the drive motor and a driving drive element on the side of the adjusting transmission.

In one embodiment, the adjusting transmission of the adjustment apparatus is formed by a spindle mechanism. A spindle mechanism of this kind comprises a spindle and can be actuated in order to bring about a longitudinal adjustment of the adjustment assembly relative to the guide rail. In this case, the spindle mechanism is operatively connected to the drive motor via the transmission element, such that the spindle mechanism moves, driven by the drive motor, and as a result the adjustment assembly can be adjusted relative to the guide rail.

In one embodiment, the adjusting transmission comprises a spindle connected to the guide rail, and a spindle nut that is operatively connected to the transmission element and is assigned to the adjustment assembly. Rotating the spindle nut relative to the spindle makes it possible for the adjustment assembly to be adjusted relative to the guide rail.

A spindle nut of this kind in particular comprises an inner drillhole having a female thread formed therein, which is in threaded engagement with a male thread of the spindle. By Rotating the spindle nut relative to the spindle, the spindle nut rolls on the spindle and is thus moved longitudinally relative to the spindle. The spindle nut is axially secured on the adjustment assembly, for example by means of a gear housing of the adjusting transmission, such that in the event of longitudinal adjustment of the spindle nut relative to the spindle arranged stationary on the guide rail, the adjustment assembly is moved along on the guide rail.

In this case, the spindle nut is operatively connected to the transmission element. For example, a drive element, for example in the form of a driving worm, can be arranged on the transmission element (for example in the form of a drive shaft), which drive element is connected to the spindle nut. For example, the spindle nut can comprise an external toothing into which a worm toothing of the drive element engages in such a way that rotating the drive element causes the spindle nut to rotate and thus to move towards the spindle.

In one embodiment, the drive element is offset along a transverse direction relative to the spindle nut and engages on a side of the spindle nut that faces with a normal direction along the transverse direction. The drive element is thus arranged laterally (with respect to a transverse direction, corresponding to the vehicle transverse direction when the adjustment apparatus is used as intended) on the spindle nut, and is operatively connected to the spindle nut at a side facing along the transverse direction, such that a force can be introduced from the drive element into the spindle nut.

In one embodiment, the spindle is arranged in the transverse direction, offset relative to the opening of the floor portion. Viewed along the height direction, the spindle and the opening are thus not aligned with one another, but rather transversely offset to one another.

In one embodiment, the transmission element is arranged so as to be laterally offset relative to the spindle, in the transverse direction. In this case, the transmission element can for example extend perpendicularly through the opening and drives a drive element, which drives a spindle nut that is in threaded engagement with the spindle.

In one embodiment, the transmission element, for example in the form of a (flexible) drive shaft, extends along the height direction, proceeding from the adjusting transmission. The height direction extends at least approximately perpendicularly to a horizontal extension plane defined by the floor portion of the vehicle floor. The transmission element thus extends perpendicularly along the vertically oriented height direction, from the adjusting transmission below the floor portion of the vehicle floor, through the opening in the vehicle floor, and to the drive motor.

In this case, the drive motor can be arranged directly above the adjusting transmission, for example on the adjustment assembly, such that the transmission element (for example in the form of a drive shaft) extends substantially in a straight line along the height direction between the adjusting transmission and the drive motor. However, the drive motor can also be arranged so as to be transversely offset relative to the adjusting transmission, such that the transmission element first extends perpendicularly, proceeding from the adjusting transmission, extends through the opening in the floor portion of the vehicle floor, and then for example describes a curvature and extends towards the drive motor. In this case, the transmission element can be formed for example by a flexible shaft.

The adjustment apparatus can comprise two guide rails extending in parallel with one another, which serve for longitudinal guidance of the vehicle seat, as is common practice in the case of vehicle seats. In this case, each guide rail is associated with an adjustment assembly and an adjusting transmission for longitudinal adjustment of the respective adjustment assembly on the respective guide rail.

The adjusting transmissions of the adjustment assembly can in each case be driven by a separate drive motor, wherein the drive motors are actuated for example electronically by a controller for coordinated, in particular synchronous, adjustment. Alternatively, the adjusting transmissions of the adjustment assemblies can also be assigned a common drive motor, which is in each case connected via a transmission element, for example in the form of a respective drive shaft, to the adjusting transmission of an adjustment assembly associated in each case, and thus jointly drives the adjusting transmissions, for adjusting the adjustment assemblies relative to the guide rails.

In one embodiment, the transmission element is guided in a guide element through the opening of the floor portion. A guide element of this kind can be formed for example by a sleeve element, and forms a guide opening for example, inside which the transmission element and/or a line, in particular an electrical line, is accommodated and guided in the region of the opening of the floor portion. Due to the guidance in the guide element, the transmission element is thus encased with respect to the outside and thus protected against contamination and damage.

In one embodiment, the assembly comprises at least one line, which is guided in the guide element through the opening of the floor portion. For example, a cable harness comprising a plurality of lines can be received in the guide element and guided through the opening of the floor portion, inside the guide element. The at least one line thus extends from a space above the floor portion into a space below the floor portion. A guide element for guiding the transmission element thus also serves, in a synergistic dual use, for guiding at least one line, in particular an electrical line, for example a cable harness comprising a plurality of lines.

The guide element can for example be fixedly connected to the adjustment assembly. The guide element can for example be made of plastics material and is secured to the adjustment assembly, for example by clipping or screwing.

In one embodiment, the drive motor is arranged on the adjustment assembly, and is thus moved together with the adjustment assembly when the adjustment assembly is adjusted relative to the guide rail. For example, the adjustment assembly comprises at least one adjustment rail that is guided on the guide rail, and one attachment part that is connected to the adjustment rail and extends through the opening of the floor portion. The attachment part extends for example perpendicularly along the height direction, from the adjustment rail, through the opening in the floor portion. The drive motor is arranged on this attachment part, wherein the drive motor is located above the floor portion and, upon adjustment of the adjustment assembly, is moved on the guide rail together with the attachment part that is connected to the adjustment rail.

Since the drive motor is arranged on the attachment part, the drive motor can in particular be located outside a footwell located centrally below the vehicle seat, such that the drive motor does not delimit such a footwell. In particular, the drive motor can be received in a trim in the region of the attachment part, such that the drive motor is not visible to a user from the outside.

The opening of the floor portion in the vehicle floor can in particular extend in a slot-shaped manner, in parallel with the longitudinal axis. The floor portion can in particular be formed by a carpet or be covered by a carpet. In this case, the opening can be formed in the carpet and be provided for example by a slot extending longitudinally along the longitudinal axis.

BRIEF DESCRIPTION OF THE DRAWINGS

The idea underlying the proposed solution will be explained in greater detail in the following, with reference to exemplary embodiments that are shown in the Figures.

DETAILED DESCRIPTION

Figure 1:
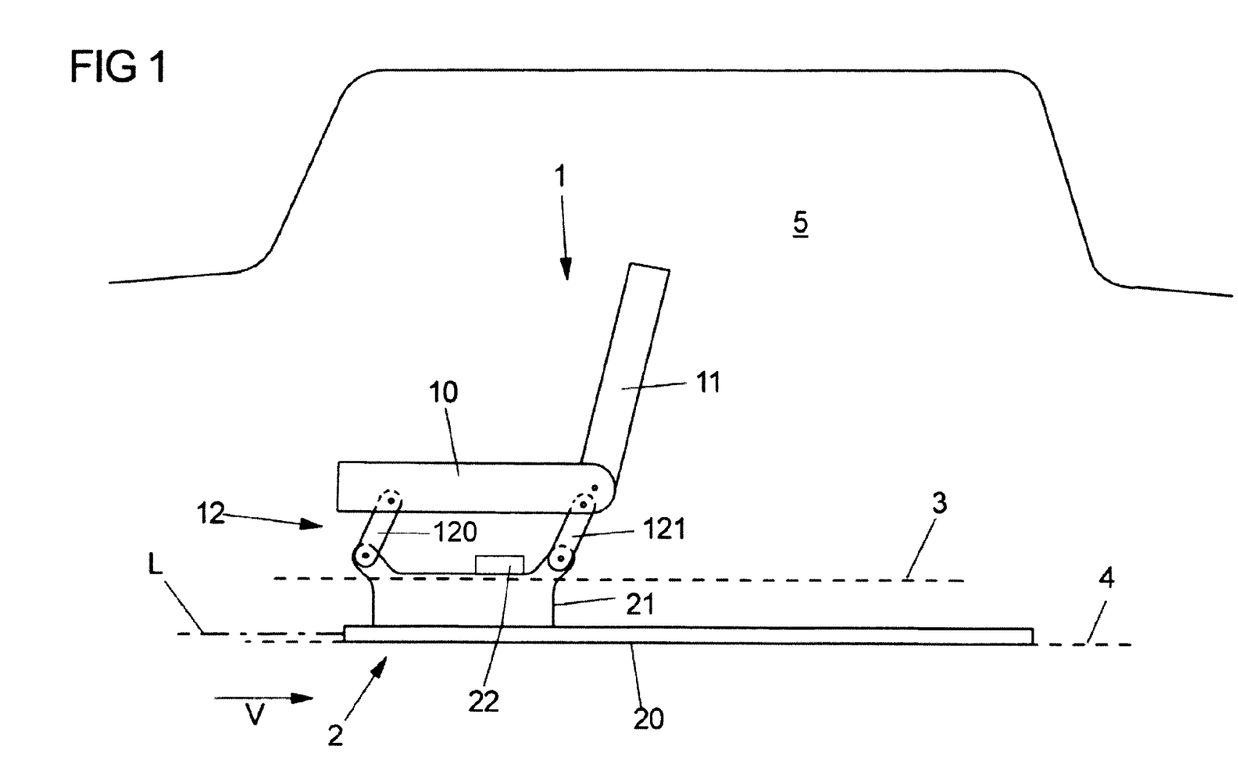
FIG. 1 is a schematic view of a vehicle seat on an arrangement of guide rails.

A vehicle seat 1, as is shown schematically in FIG. 1, comprises a seat part 10 and a backrest 11 arranged pivotably on the seat part 10. A vehicle seat 1 of this kind can for example be a vehicle front seat in the first seat row in a vehicle 5, but can also be configured as a vehicle back seat, for example in the second or third seat row.

The vehicle seat 1 is connected to an adjustment assembly 21 of a (longitudinal) adjustment apparatus 2 via a vertical adjustment apparatus 12. Within the context of the vertical adjustment direction 12, coupling elements 120, 121 in the form of swing arms that are pivotably connected both to the seat part 10 and to the adjustment assembly 21, are pivotable relative to the adjustment assembly 21 for the purpose of vertical adjustment of the vehicle seat 1, such that the seat part 10 can be raised or lowered for setting a comfortable sitting position for a vehicle occupant.

Figure 2:
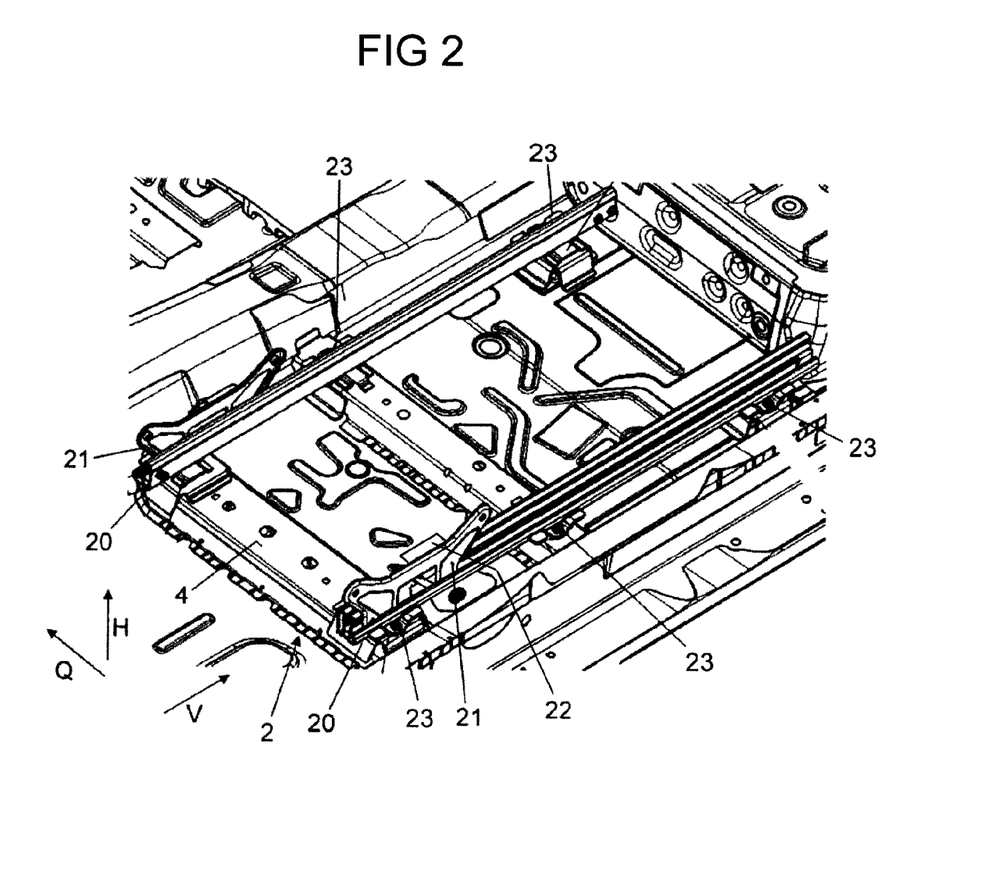
FIG. 2 is a view of an adjustment apparatus comprising two guide rails extending longitudinally on a floor assembly.

The adjustment apparatus 2 comprises an arrangement of guide rails 20 extending in parallel to one another, which— as is visible with reference to FIG. 2 which shows an exemplary embodiment of such guide rails 20—in each case extend along a longitudinal axis L and are fixedly connected to a floor assembly 4 of the vehicle 5 and in each case guide an adjustment assembly 21 in a sliding manner along an adjustment direction V that is colinear to the longitudinal axis L. Via one electromotive drive device 22 in each case, implemented for example as a spindle drive comprising a spindle, the adjustment assemblies 21 can be adjusted on the guide rails 20, in order to in this way adjust a longitudinal position of the vehicle seat 1 along the adjustment direction V.

In the exemplary embodiment shown, the floor assembly 4, for example implemented by a sill of the vehicle body, is arranged below an actual vehicle floor 3 that is visible from the vehicle interior and is covered by a carpet. The guide rails 20 are thus not visible from the vehicle interior, when used as intended, but rather are hidden below the vehicle floor 3. Since the guide rails 20 are arranged below the actual vehicle floor 3 and thus hidden relative to the vehicle interior, the guide rails 20 do not impair the aesthetic impression in the vehicle interior.

Figure 3:
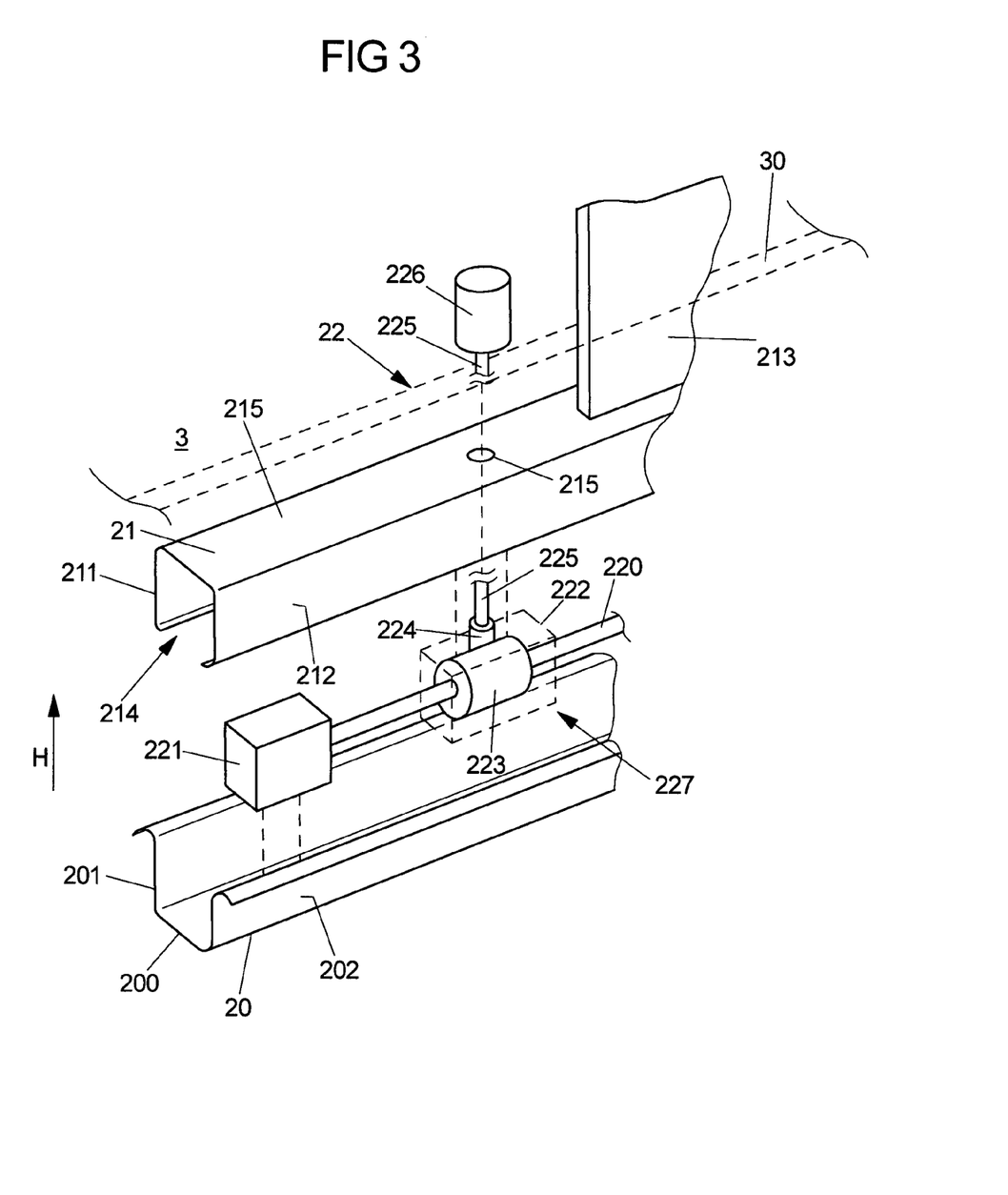
FIG. 3 is a schematic view of an adjustment apparatus for adjusting a vehicle seat in a vehicle.

FIG. 3 schematically shows an exemplary embodiment of a drive device 22 of an adjustment apparatus 2, which comprises an electromotive drive motor 226 and an adjusting transmission 227 formed by a spindle mechanism. A spindle 220 is connected, via spindle retaining elements 221, in a stationary and non-rotatable manner, to a base 200 of the (associated) guide rail 20 that is arranged between legs 201, 202, and thus secured relative to the guide rail 20. The adjusting transmission 227 is operatively connected to the spindle 220 in that a spindle nut 223 of the adjusting transmission 227 is in threaded engagement with a male thread of the spindle 220 via a female thread formed in an inner drillhole of the spindle nut 223. The spindle nut 223 is encased, together with a drive element 224 arranged on a drive shaft 225, in a gear housing 222 (shown in dashed lines in FIG. 3) that is connected to an adjustment rail 214 of the adjustment assembly 21, and thereby axially secured relative to the adjustment rail 214 of the adjustment assembly 21.

In the exemplary embodiment shown, in the form of a drive shaft 225, the drive motor 226 is coupled to the adjusting transmission 227 via a transmission element. Driven by the drive motor 226, the transmission element, in the form of the drive shaft 225, for example formed by a flexible shaft, can be turned, as a result of which the drive element 224 is moved and thus the spindle nut 223 is rotated. During rotating, the spindle nut 223 rolls on the spindle 220 and is adjusted longitudinally on the spindle 220, due to the threaded engagement, which results in shifting of the adjustment assembly 21 on the guide rails 20.

The drive element 224 is implemented for example by a driving worm, which comprises a worm gear toothing and is engaged, via the worm gear toothing, with an external toothing of the spindle nut 223, in such a way that a rotational movement of the drive element 224 is converted into a rotational movement of the spindle nut 223.

In the exemplary embodiment shown, the drive motor 226 is arranged above a floor portion formed by the vehicle floor 3, and is thus separated via the vehicle floor 3 from the adjusting transmission 227 located therebelow. In this case, the transmission element, in the form of the drive shaft 225, extends from the adjusting transmission 227 along a height direction H and thus perpendicularly in the direction of the drive motor 226. The drive shaft 225 passes through an opening 215 in a base 210 (interconnecting legs 211, 212) of the adjustment rail 214, and extends through a slot-shaped opening 30 (shown by dashed lines in FIG. 3) in the vehicle floor 3.

The drive motor 226 can for example be arranged in a fixed manner on an attachment part 213 extending perpendicularly form the base 210 of the adjustment rail 214, as is shown schematically in FIG. 3. The attachment part 213 (also) extends through the slot-shaped opening 30 in the vehicle floor 3, and is moved together with the adjustment rail 214 and the drive motor 226 in the event of an adjustment of the adjustment assembly 21. Via the attachment part 213, the vehicle seat 1 is linked to the adjustment assembly 21, for example via a vertical adjustment direction 12, as is shown schematically in FIG. 1.

Figure 4:
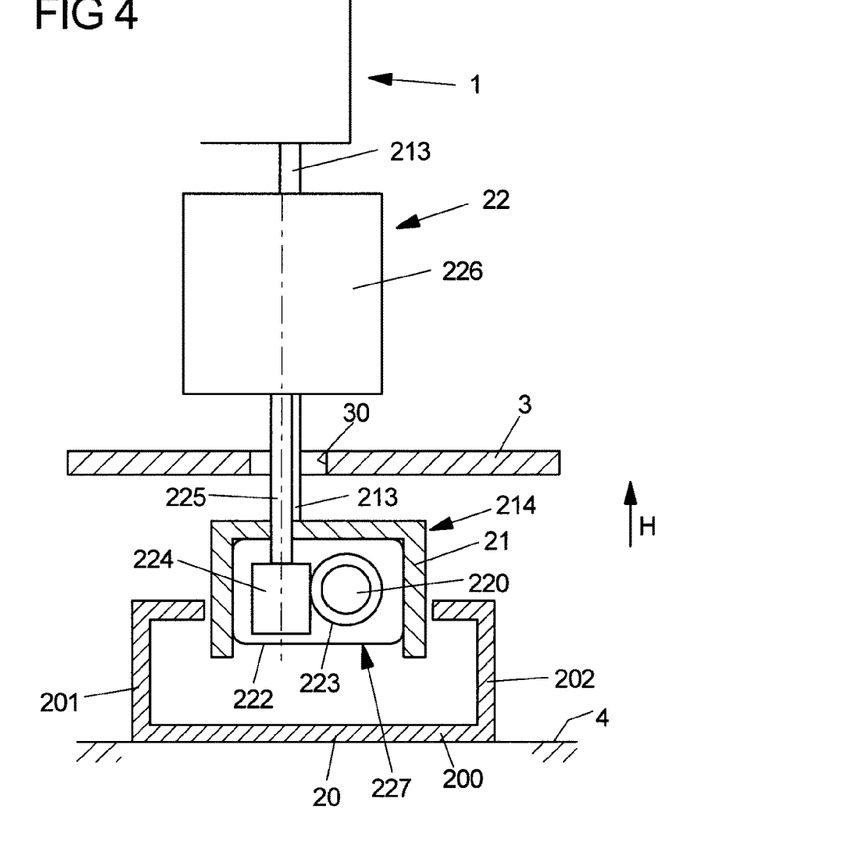
FIG. 4 is a schematic view of an arrangement of a drive motor relative to an adjusting transmission of the adjustment apparatus.

In an exemplary embodiment shown in FIG. 4, the drive motor 226 is arranged perpendicularly above the adjusting transmission 227, and is coupled to the adjusting transmission 227 by means of a drive shaft 225 extending substantially in a straight line along the height direction H. In this case, the drive motor 226 is arranged in a fixed manner on the attachment part 213 of the adjustment assembly 21, and is moved together with the attachment part 213 when the adjustment assembly 21 is adjusted.

In this exemplary embodiment, the drive motor 226 is thus arranged aligned above the adjusting transmission 227, and thus above the associated guide rail 20, viewed in the height direction H. The drive motor 226 is thus arranged outside a footwell, between the adjustment assemblies 21 associated with the vehicle seat 1 (see for example FIG. 2), such that the footwell is kept largely free and is not impeded by the drive motor 226.

As can be seen from FIG. 2, (typically) one vehicle seat is assigned two adjustment assemblies 21 which are guided on mutually parallel longitudinally extending guide rails 20 and are to be adjusted in order to adjust the vehicle seat 1. In this case, each adjustment assembly 21 can, in one embodiment, be associated with a separate drive motor 226, which serves for driving an adjusting transmission 227 associated with the respective adjustment assembly 21, as is shown in FIG. 4.

Figure 5:
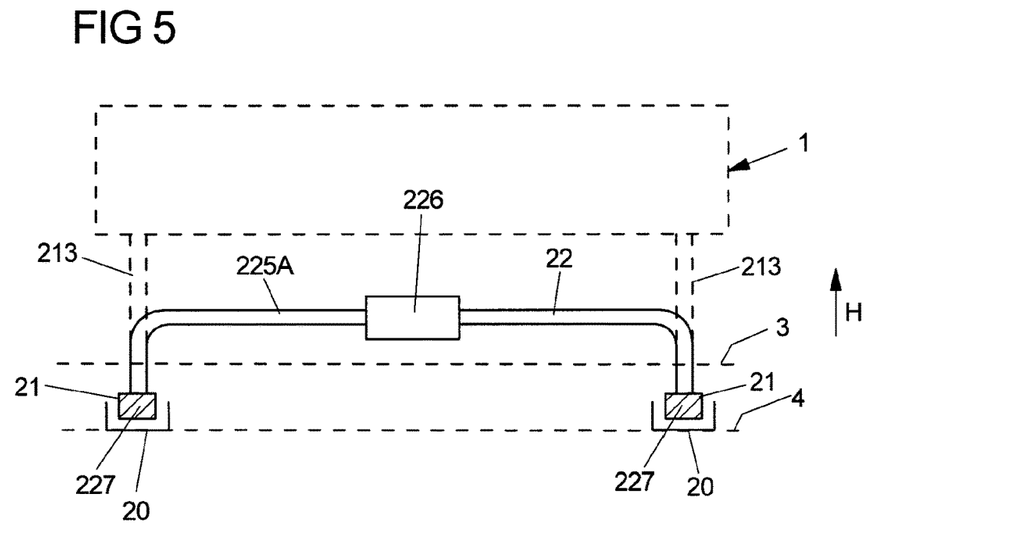
FIG. 5 is a schematic view of an exemplary embodiment of an adjustment apparatus comprising a drive motor, which is jointly associated with adjusting transmissions of two adjustment apparatuses.

In another embodiment, shown schematically in FIG. 5, adjusting transmissions 227 of the adjustment assemblies 21 can also be associated with a common drive motor 226, which is connected to the two adjusting transmissions 227 via drive shafts 225A, 225B, and thus serves for collectively driving the adjusting transmission 227. In turn, each drive shaft 225A, 225B extends upwards, substantially perpendicularly in the height direction H, proceeding from the adjusting transmission 227 that is associated in each case, but its course then curves and extends towards the common drive motor 226, as is visible from FIG. 5.

Both in the exemplary embodiment according to FIG. 4 and in the exemplary embodiment according to FIG. 5, the vehicle seat 1 is connected to the adjustment assemblies 21 via one or more attachment parts 213 of each adjustment assembly 21, such that the vehicle seat 1 is adjusted longitudinally in the event of an adjustment of the adjustment assemblies 21, on the guide rails 20.

As can be taken from FIG. 4, the drive shaft 225 extends through the opening 30 in the vehicle floor 3. In this case, the drive shaft 225 can be arranged in the extension plane of the attachment part 213 and has for example a diameter that is not or only insignificantly larger than a thickness of the attachment part 213 measured transversely to the height direction H, such that the drive shaft 225 can be readily guided through the opening 30, through which the attachment part 213 also extends.

Figure 6:
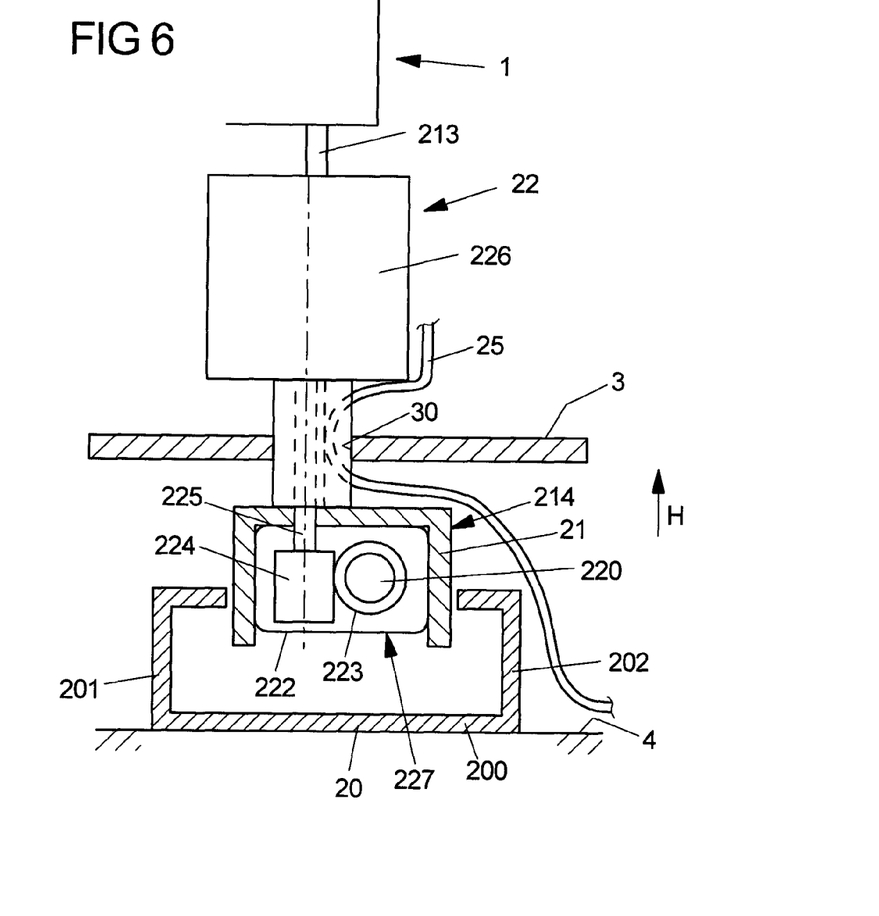
FIG. 6 is a view of an exemplary embodiment of an adjustment apparatus comprising a guide element for guiding a transmission element in the form of a drive shaft between a drive motor and an adjusting transmission.

In an exemplary embodiment shown in FIG. 6, the adjustment apparatus 22 comprises a guide element 24, for example in the form of a guide sleeve, which is connected for example to the base 210 of the adjustment rail 214 and extends between the base 210 and the drive motor 226 that is arranged above the adjustment rail 214 and above the vehicle floor 3. As is visible from FIG. 6 in conjunction with the schematic view according to FIG. 7, the drive shaft 225 is received inside a guide opening 240 of the guide element 24 and is guided inside the guide opening 240 in such a way that the drive shaft 225 is shielded from the outside by the guide element 24.

Figure 7:
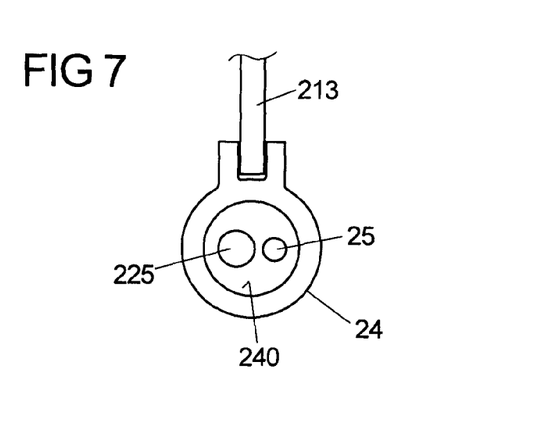
FIG. 7 is a schematic view of the guide element comprising the drive shaft guided therein and a cable harness.

In this case, the drive shaft 225 is encased inside the guide element 24, in particular in the region of the opening 30 of the vehicle floor 3. The guide element 24 extends through the opening 30. The drive shaft 225 can thus in particular not come into contact with edges of the vehicle floor 3 that delimit the opening 30 laterally, and is thus protected from the outside, against damage and dirt, due to being received in the guide element 24.

In the exemplary embodiment shown in FIG. 6, furthermore at least one line 25, for example a cable harness comprising a plurality of lines, is received in the guide opening 240 of the guide element 24 and thus guided in the guide element 24. The cable harness extends inside the guide element 24, from a space above the vehicle floor 3 into a space below the vehicle floor 3, and thus passes through the vehicle floor 3, inside the guide element 24.

The cable harness can for example comprise one or more electrical lines 25. The cable harness can, however, also comprise one or more other lines, for example pneumatic or hydraulic lines.

The guide element 24 can for example be made of synthetic material. In this case, as is shown schematically in FIG. 7, the guide element 24 is for example fixedly connected to the attachment part 213 and thus secured on the attachment part 213, for example by clipping or screwing.

The drive shaft 225 can be formed for example by a flexible shaft. The drive shaft 225 can, however, also be formed by a rigid shaft.

The transmission element 225 can furthermore also be configured for example as a sprocket or worm, instead of as a drive shaft.

The idea underlying the solution is not limited to the exemplary embodiments described above, but rather can in principle also be implemented in an entirely different way.

In principle one or more guide rails can be assigned to the vehicle seat. In the case of future vehicle seats, it is in particular also conceivable to arrange a vehicle seat in a vehicle in a manner longitudinally adjustable only via a single guide rail, such that in this case a single guide rail on one side of the vehicle seat or centrally below the vehicle seat may be sufficient.

The invention claimed is:

1. An assembly of a vehicle, comprising:
a floor assembly arranged stationary in the vehicle,
a floor portion, and
an adjustment apparatus for longitudinal adjustment of a vehicle seat in the vehicle, the adjustment apparatus comprising a guide rail which is connected to the floor assembly and extends along a longitudinal axis on the floor assembly, an adjustment assembly which is guided on the guide rail along the longitudinal axis and is assigned to the vehicle seat, and a drive device having a drive motor, an adjusting transmission and a transmission element connecting the drive motor to the adjusting transmission, wherein the adjusting transmission can be driven by the drive motor for adjusting the adjustment assembly relative to the guide rail,
wherein the guide rail and the adjusting transmission are arranged below the floor portion as viewed along a height direction, and the drive motor is arranged above the floor portion as viewed along the height direction, wherein the transmission element extends through an opening of the floor portion,
wherein the adjusting transmission is configured as a spindle mechanism, and
wherein the adjusting transmission comprises a spindle that is connected to the guide rail and a spindle nut that is operatively connected to the transmission element and is assigned to the adjustment assembly, wherein the adjustment assembly can be adjusted relative to the guide rail by rotating the spindle nut relative to the spindle.

2. The assembly according to claim 1, wherein the transmission element is formed by a drive shaft that is connected to the drive motor or is formed by the drive motor.

3. The assembly according to claim 1, wherein the transmission element extends perpendicularly or almost perpendicularly through the opening of the floor portion.

4. The assembly according to claim 1, wherein the transmission element is configured as a flexible drive shaft.

5. The assembly according to claim 1, wherein the transmission element extends in the height direction from the adjusting transmission.

6. The assembly according to claim 1, wherein the adjustment apparatus comprises a guide element which is received in the opening of the floor portion, in which the transmission element and/or a line is guided through the opening of the floor portion.

7. The assembly according to claim 6, further comprising at least one line which is guided in the guide element through the opening of the floor portion.

8. The assembly according to claim 7, wherein the at least one line is configured as an electrical line.

9. The assembly according to claim 6, wherein the guide element is fixedly connected to the adjustment assembly.

10. The assembly according to claim 1, wherein the drive motor is arranged on the adjustment assembly.

11. The assembly according to claim 1, wherein the adjustment assembly comprises at least one adjustment rail that is guided on the guide rail, and an attachment part that is connected to the adjustment rail and extends through the opening of the floor portion, wherein the drive motor is arranged on the attachment part and/or on the adjustment rail.

12. The assembly according to claim 1, wherein the opening of the floor portion extends in a slot-like manner in parallel with the longitudinal axis.

13. The assembly according to claim 1, wherein the drive device comprises a drive element, which is connected to the transmission element, for driving the spindle nut.

14. The assembly according to claim 13, wherein the drive element is offset along a transverse direction relative to the spindle nut and engages on a side of the spindle nut that faces with a normal direction along the transverse direction.

15. The assembly according to claim 1, wherein the spindle is arranged so as to be offset relative to the opening of the floor portion, along a transverse direction.

16. The assembly according to claim 1, wherein the transmission element is arranged so as to be laterally offset relative to the spindle of the adjusting transmission, along a transverse direction.

* * * * *